G. SYKES.
LOAD BRACING AND VENTILATING DEVICE FOR VEHICLES.
APPLICATION FILED MAR. 18, 1922.
1,421,612.   Patented July 4, 1922.
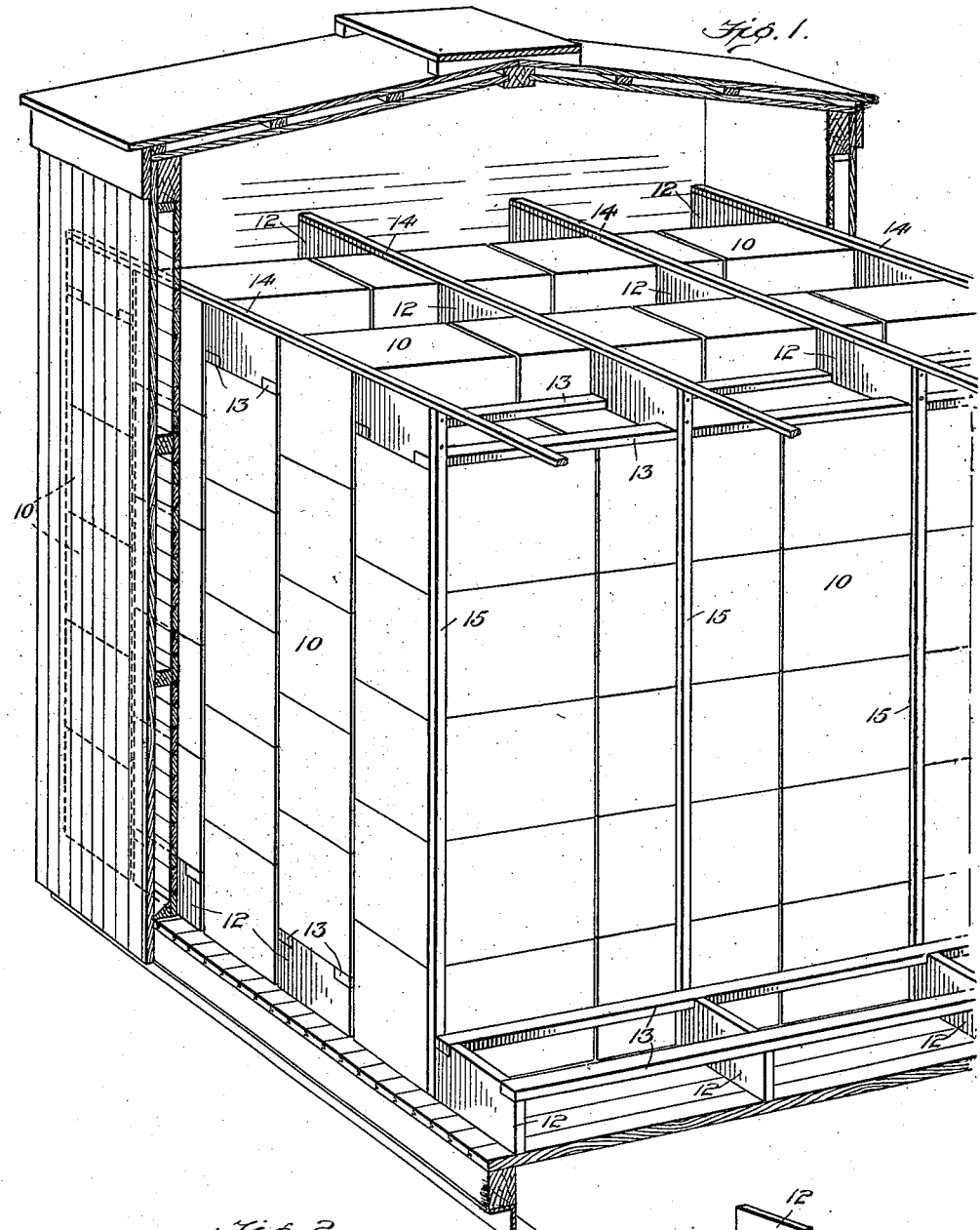
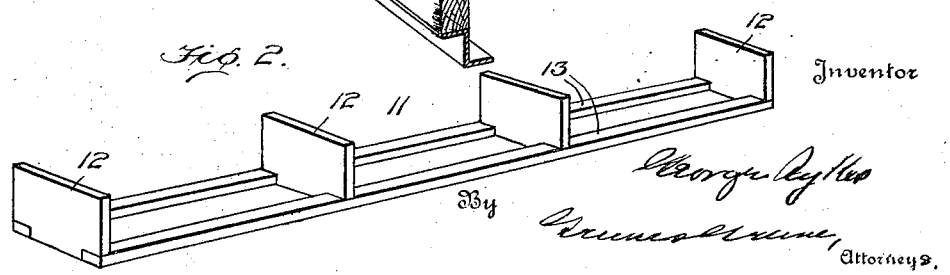

UNITED STATES PATENT OFFICE.

GEORGE SYKES, OF SAN FRANCISCO, CALIFORNIA, ASSIGNOR OF ONE-HALF TO THOMAS B. BLACKBURN AND ONE-HALF TO CHARLES F. POTTER, BOTH OF LOS ANGELES COUNTY, CALIFORNIA.

LOAD BRACING AND VENTILATING DEVICE FOR VEHICLES.

1,421,612.  Specification of Letters Patent.  Patented July 4, 1922.

Application filed March 18, 1922. Serial No. 544,893.

*To all whom it may concern:*

Be it known that I, GEORGE SYKES, a citizen of the United States, and resident of city and county of San Francisco and State of California, have invented certain new and useful Improvements in Load Bracing and Ventilating Devices for Vehicles, of which the following is a specification, reference being had therein to the accompanying drawing.

This invention relates to the loading of goods in land or water vehicles for transportation, and among its objects are avoiding the very common mechanical injury to more or less fragile merchandise, and securing ventilation in all parts of the load.

It is a well known fact that in shipping food—vegetable products, or fruits, for example, sudden movements of a car cause part of the goods to be subjected to compressive strains, due to momentum and inertia of the load, as a whole, force being almost hammer-like, while other portions of the load are subjected to less heavy strains. All shippers of fruit in quantities are well aware that in this way enormous losses are sustained, both at the moment of strain and later by loss in the keeping quality of the fruit. Nor is this kind of loss confined to fruit.

These evils are avoided by dividing the load into parts by devices which transfer strains on any part directly to the body of the car or other vehicle, instead of transmitting it to the succeeding portion and thereby accumulating the force of all the parts of the load. These devices are also adapted to secure ventilation between the parts of the load and in each part thereof.

In the accompanying drawings,

Fig. 1 is a perspective view of a portion of a loaded car provided with my devices, Fig. 2 is a view of an upper cleat or block seen also in Fig. 1.

For illustration, the load is shown as contained in duplicate boxes 10, for example, orange boxes, placed in a car in ranks of boxes superposed in vertical planes, the ranks being, like the boxes in each rank, in contact. The first rank of boxes 10 is supported by the car floor and rests against the end of the car, and the rank as a whole is supported against the sides of the car or, if necessary, by interposed blocks or projections from the sides. Upon the side of the rank opposite the car end, cleats 11, or low stands as wide as a box, are pressed against the rank and secured, usually to the car walls, so that they will not slip along the car floor. Upon this stand is formed a second rank like the first, the upper layer of boxes of course projecting above the top of the first rank to a distance equal to the height of the stand or cleat 11, which consists of like transverse blocks 12 connected by strips 13 extending from side to side of the car.

The second rank is followed by a third, precisely like the first, and this is succeeded by a fourth rank like the second, and resting upon a duplicate cleat member, and so on until the load or partial load is completed, certain ranks, usually alternate or even numbered ranks, being higher than the others.

Above the lower ranks, inverted cleats like those below are placed on the lower ranks with their blocks 12 directly above the blocks 12 below, and to the upper sides of the blocks in each line are fixed strips 14 extending lengthwise of the car and resting upon the upper boxes of the higher ranks. After a selected number of ranks have been placed as described, vertical spacing members 15 are placed against the broad exposed face of the last rank and fixed to the blocks or cleats 12 to secure them in place, and another cleat is added, at the floor, holding the spacers against the boxes already in place. Upon this cleat or stand, another rank may be formed, and so on, as before.

The strips 14, above the ranks, rest against the end of the car, and may extend to the opposite end wall.

The boxes in the load are now divided into lots at the spacer members and any thrust is not sustained by the adjacent lot but for each lot, or set of ranks, is transmitted directly to the car by the cleats and the strips above, so that no set receives strain other than that caused by its own inertia and momentum, according as the car is suddenly started or stopped.

Thus if there be twenty sets of ranks or parts of the whole load, the possible strain is divided by twenty, and practically eliminated.

It is to be noted that each set of spacers gives an air space from side to side and from top to bottom of the car, and that every rank has ventilation through the open spaces in the cleats underlying alternate ranks, and in communication with such slight crevices as exist between the successive ranks which are not held apart by spacers.

Obviously, the cleats, strips, and spacers used will be adapted to the kind of receptacle used and the weight of the load, and it is also evident that such receptacles may differ in size in different cars or even in ends of the same car; and further that the framework employed is not absolutely unyielding, nor are the receptacles, and hence that there is a slight give and take movement without any of the usual looseness which in long routes is very destructive.

What I claim is:

1. The method of arranging fruits and other vegetable products in the natural state for shipment in vehicles, which consists in dividing the load of crated goods in transverse load parts by light frame members and adding members for transmitting from each of said parts to the end portions of the vehicle strains longitudinal with respect to the latter, whereby each part is protected from force developed in other parts of the load.

2. The method of avoiding injury to crated fruit and the like while it is in transit in common cars, which consists in dividing the load transversely into many parts by light strips of material, and arranging other members to transmit directly to the end portions of the car longitudinal strains arising in any of said parts through momentum and inertia.

3. The combination with a common car, of a light, readily removable interior frame adapted to form in the load, as it is being arranged, a series of ventilating passages and to transmit to the car end walls from many parts of the load strains due to momentum and inertia of said parts, respectively.

4. The combination with a vehicle, of vertical transverse ranks of superposed boxes alternating with like closely adjacent ranks supported at a slightly different height, to break joints in adjacent boxes, aiding in preventing the accumulation of longitudinal thrust forces, and devices for transmitting to the car, directly, strains developed in a part only of the load by inertia and momentum.

5. The combination with a vehicle for transporting packages of fruit and other vegetable products in their natural state, all supported by the vehicle floor, of devices dividing the load transversely into lots of contiguous packages, and means for transmitting the longitudinal strains exerted by each lot directly to the car itself, relieving adjacent lots from strains arising in other lots.

6. The combination with a car, of goods receptacles arranged in the car in vertical ranks of superposed boxes alternating with like ranks raised slightly above the closely adjacent ranks first mentioned, members supporting the raised ranks and fitting the spaces between adjacents ranks, and fixed with respect to the car floor, similar members resting on the lower ranks and fitting between the upper boxes of the adjacent raised ranks, and longitudinal members fixed to the said similar members, resting upon the intermediate ranks, and extending from end to end of the car.

7. The method of minimizing injury to crated fruits while being transported in vehicles which consists in dividing the load mass transversely into lots of directly superposed crates the weight of which rests upon the vehicle floor, and diverting from each lot to the end walls of the car strains otherwise transmitted to the next lot.

8. The method of arranging in a car packages of fragile food products in their natural state, which consists in forming contiguous transverse ranks of superposed packages supported by the car floor, and offsetting some of said ranks vertically with respect to adjacent ranks, to break joints and to allow air to pass below the raised ranks.

In testimony whereof I hereunto affix my signature.

GEORGE SYKES.